Figure 8:
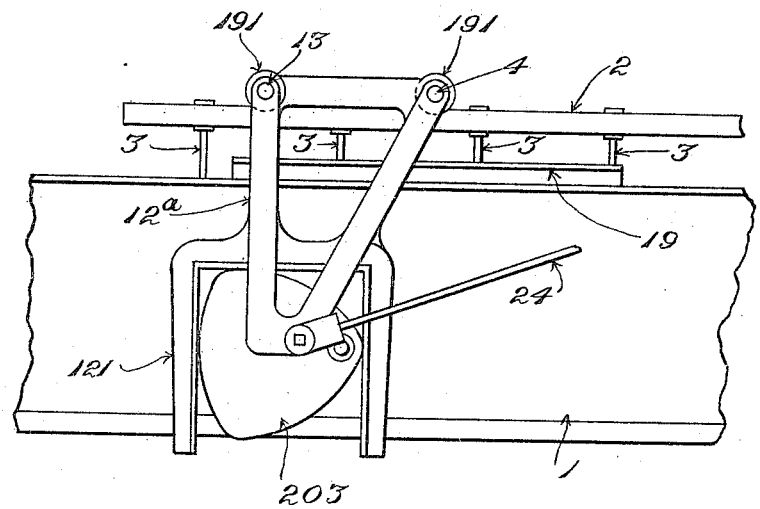

No. 889,157.  PATENTED MAY 26, 1908.
F. G. SARGENT.
WOOL WASHING MACHINE.
APPLICATION FILED SEPT. 24, 1906.
5 SHEETS—SHEET 1.
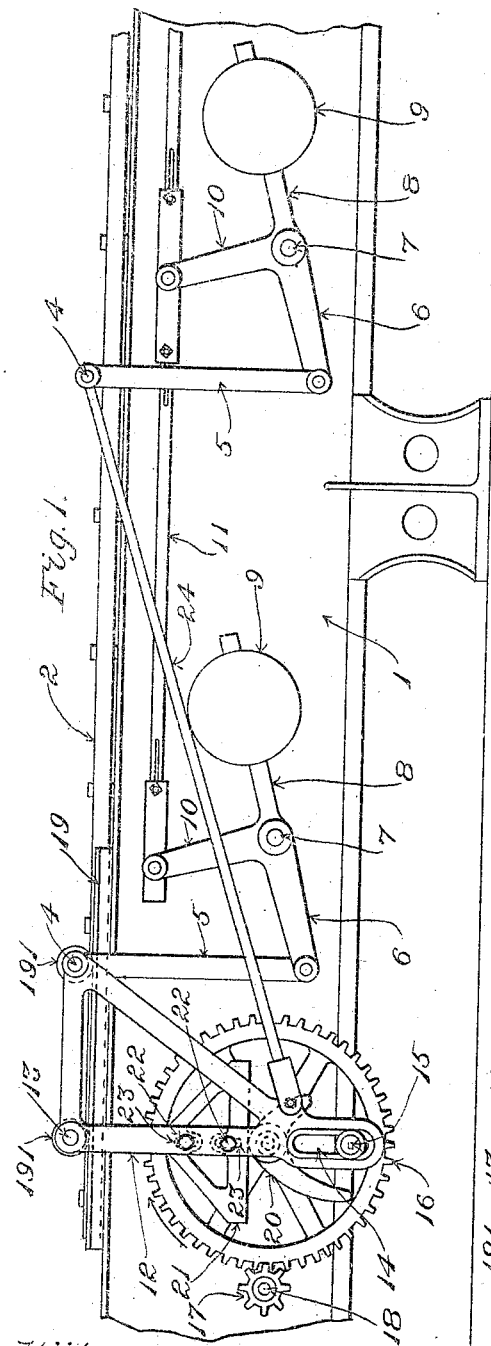
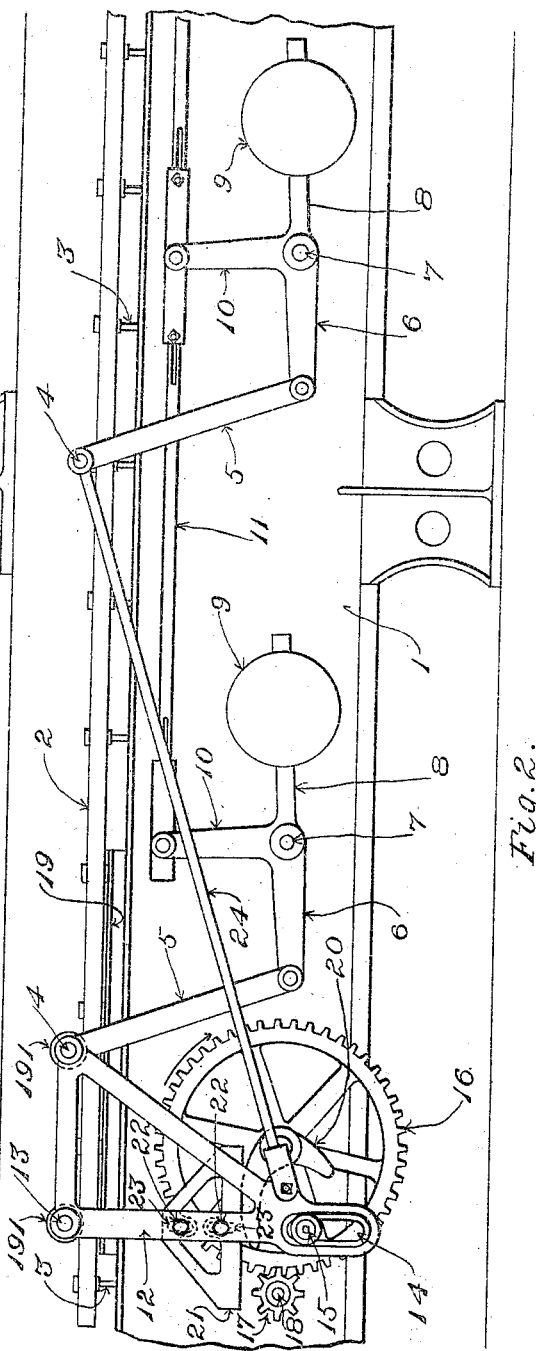
Witnesses:
Oscar F. Hill
Nathan B. Day
Inventor:
Frederick G. Sargent
by Chas. F. Randall
Attorney.

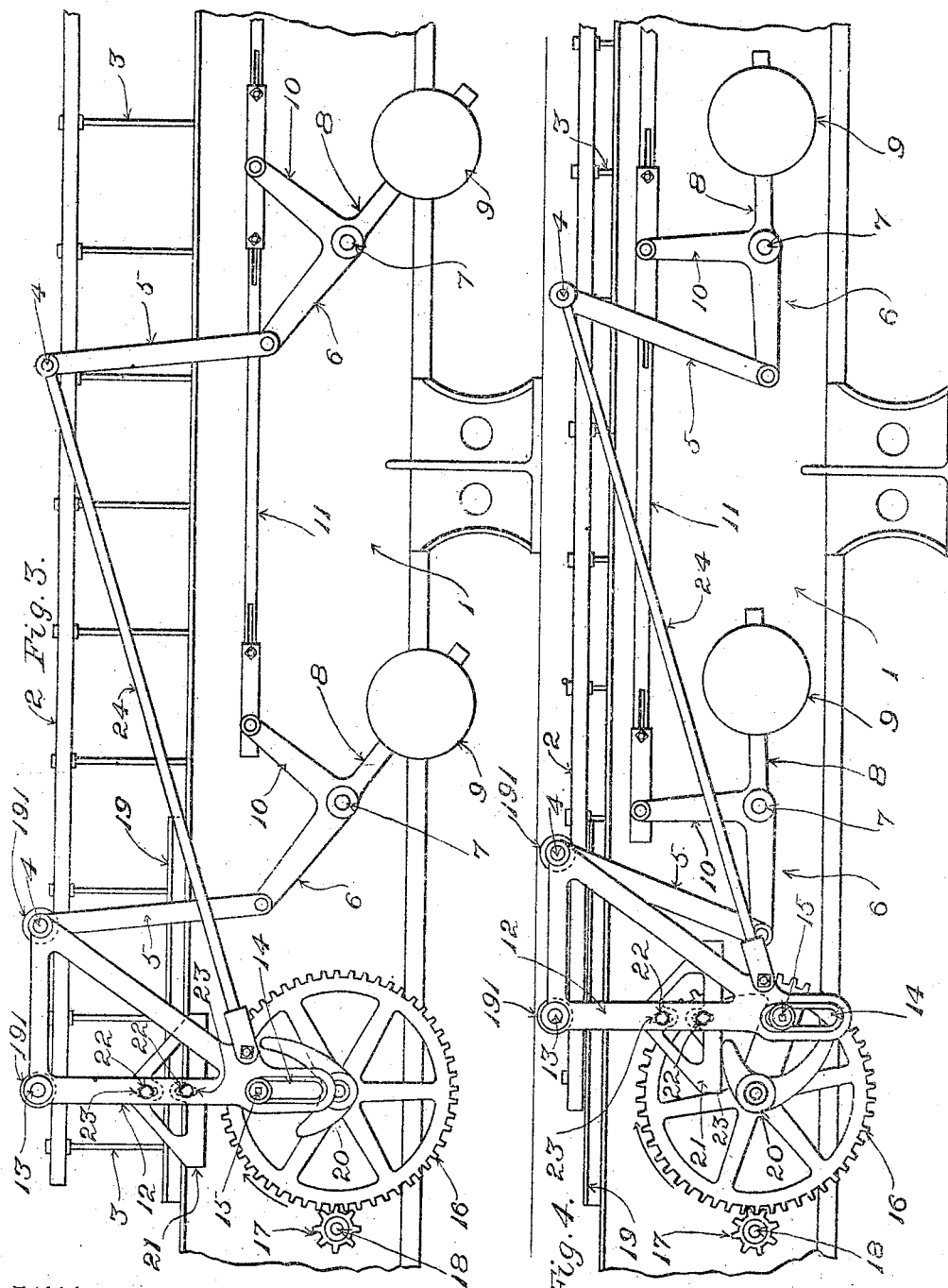

No. 889,157. PATENTED MAY 26, 1908.
F. G. SARGENT.
WOOL WASHING MACHINE.
APPLICATION FILED SEPT. 24, 1906.
5 SHEETS—SHEET 3.
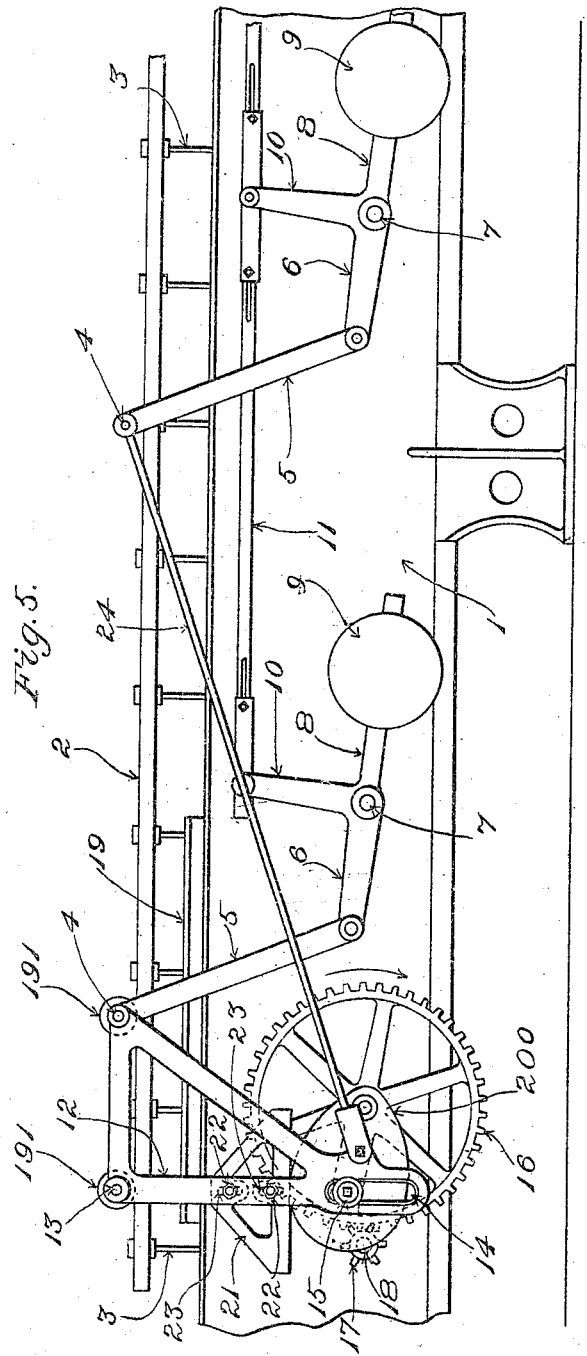
Witnesses:
Oscar F. Hill
Nathan B. Day
Inventor:
Frederick G. Sargent
by Chas. F. Randall
Attorneys.

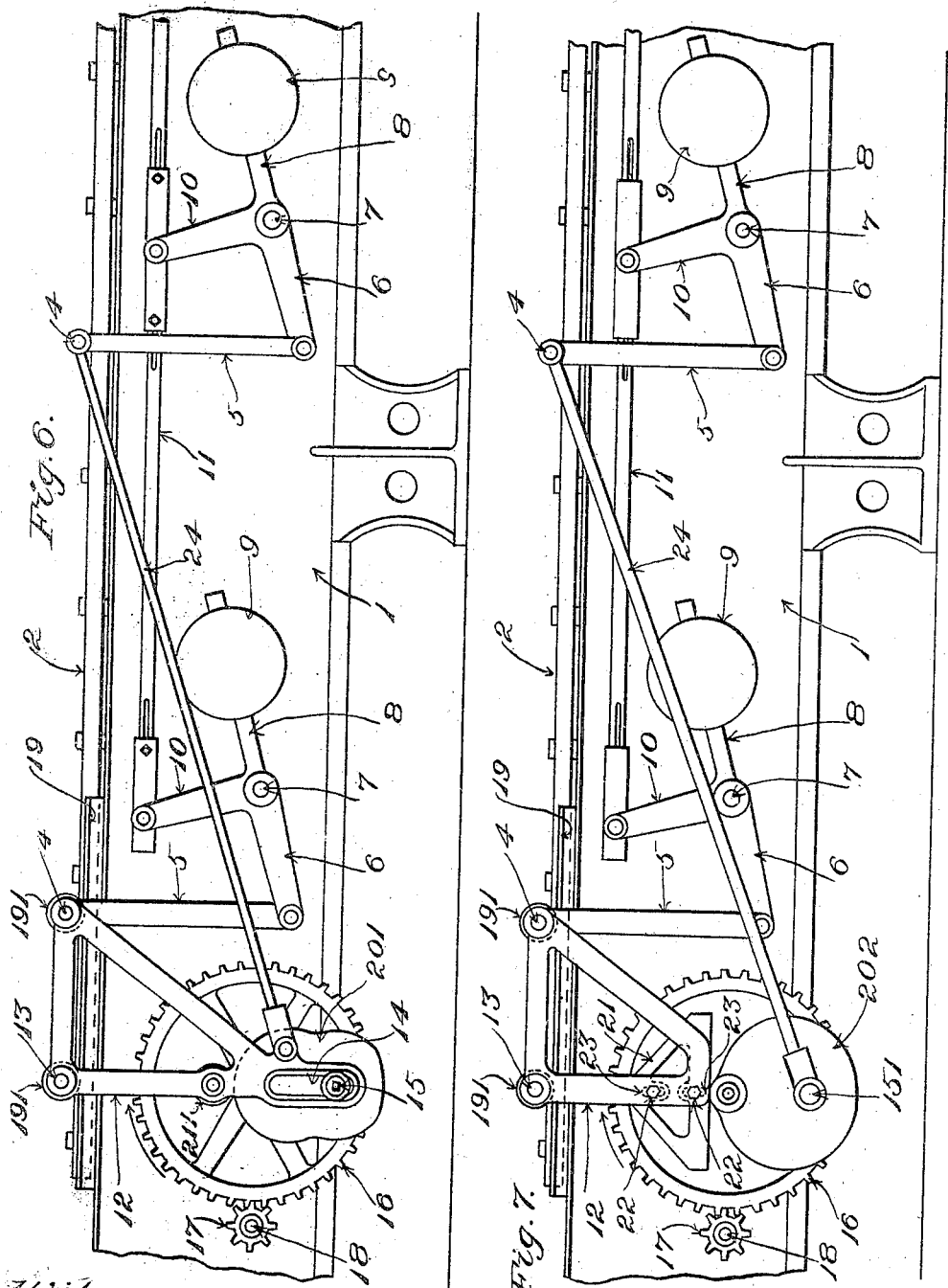

No. 889,157. PATENTED MAY 26, 1908.
F. G. SARGENT.
WOOL WASHING MACHINE.
APPLICATION FILED SEPT. 24, 1906.

5 SHEETS—SHEET 5.

Witnesses:
Oscar F. Hill
Edith J. Anderson

Inventor:
Frederick G. Sargent
by Chas. F. Randall
Attorney.

UNITED STATES PATENT OFFICE.

FREDERICK G. SARGENT, OF GRANITEVILLE, MASSACHUSETTS, ASSIGNOR TO C. G. SARGENT'S SONS CORPORATION, OF GRANITEVILLE, MASSACHUSETTS, A CORPORATION OF MASSACHUSETTS.

WOOL-WASHING MACHINE.

No. 889,157.　　　　Specification of Letters Patent.　　　　Patented May 26, 1908.

Application filed September 24, 1906. Serial No. 335,936.

*To all whom it may concern:*

Be it known that I, FREDERICK G. SARGENT, a citizen of the United States, residing at Graniteville, in the county of Middlesex, State of Massachusetts, have invented a certain new and useful Improvement in Wool-Washing Machines, of which the following is a specification, reference being had therein to the accompanying drawings.

The invention relates to the harrow-operating mechanism of wool-washing machines, and is more particularly an improvement in harrow-operating mechanism of the type employed in the well-known Sargent wool-washing machines. In the latter, as usually constructed, the harrow (which is more or less completely counterbalanced) derives its movement from a crank, the pin of which works in a vertical slot formed in an arm, termed in the art a "harp" projecting from the harrow. As the crank rotates the crank-pin in moving upwardly encounters the upper end of the said slot, raising the harrow so as to withdraw the teeth thereof from the contents of the bowl or tank. The crank-pin supports the harrow during the upper part of its revolution, and meanwhile acts against one side-wall of the slot so as to move the harrow endwise toward the feeding end of the bowl or tank. By the continued rotation of the crank the harrow is lowered, plunging its teeth into the contents of the bowl or tank, until trucks or rolls carried by the harrow take bearing upon tracks which are provided on the side-walls of the bowl or tank, after which during the lower part of the revolution of the crank the crank-pin acts against the other wall of the slot to turn the harrow lengthwise toward the delivery-end of the bowl or tank, advancing the fibrous material that is contained within the bowl or tank toward the said end. The lifting of the harrow begins, and the lowering of the same is arrested, at times when the radial line of the crank-pin is about parallel with the harrow, and when the velocity of the vertical movement derived from the crank is at its greatest. Consequently, the action of the crank-pin in striking upwardly against the upper end of the slot and suddenly lifting the harrow from its supporting tracks occasions shock and strain, resulting in wear and other injury and shocks accompanied by injurious consequences also occur when the harrow is dropped upon the said tracks at the conclusion of its movement endwise toward the feeding end of the bowl or tank.

The general object of the present invention is to obviate the drawbacks of the harrow-operating mechanism heretofore in use, and to provide actuating means for the harrow acting to begin the lifting movement of the harrow, and to terminate the lowering movement thereof, without shock, strain, wear, and other injurious effects which, heretofore have occurred. This object is attained by the employment, in combination with the harrow and its fixed arm or harp, of means operating with crank-action to reciprocate the harrow lengthwise and with cam-action to produce the vertical movements thereof.

The invention is illustrated by the accompanying drawings, in which latter,—

Figure 1 shows in side elevation a portion of a Sargent wool-washing machine with an embodiment of the invention applied thereto, the harrow being shown in its lowest position and advanced about halfway of its stroke toward the delivery end of the bowl or tank. Fig. 2 is a similar view showing the harrow completing the said stroke and beginning its rise. Fig. 3 is a similar view showing the harrow in its highest position and returned half-way toward the feeding-end of the bowl or tank. Fig. 4 is a similar view showing the harrow practically at the termination of its stroke toward the feeding-end, and partly lowered. Figs. 5, 6, 7, and 8 are views in side elevation showing other embodiments of the invention.

Having reference to the drawings,—In each of the figures, 1 designates a portion of the bowl or tank of a wool-washing machine, at 2 a portion of the harrow thereof, and at 3, 3, Figs. 2 to 5 and 8, the teeth of the harrow. At 4, 4, Figs. 1 to 7, are cross-rods forming parts of the harrow, at 5, 5, are side-arms hung by their upper ends to the outer ends of the said cross-rods, and at 6, 6, are arms to which the lower ends of side-arms 5, 5, are hung, the said arms 6, 6, being fast on rock-shafts 7, 7, extending transversely with respect to the bowl or tank (in this instance extending through tubes or pipes set in the opposite side-walls of the same as in United States Letters Patent No. 521,823, dated June 26, 1894) and provided with other arms 8, 8, extending oppositely with respect to the arms 6, 6, the said arms 8, 8, carrying weights 9, 9, by which the harrow and its connections are counter-balanced, the rock-shafts being also provided with upwardly-extending arms 10, 10, which are linked together by connections 11, 11, to cause the counter-balances and the different portions of the length of the harrow to rise and fall in unison.

At 12 is the so-called harp, located outside the bowl or tank and having the upper portion thereof fitted to the outer ends of a cross-rod 4 and to an adjacent cross-rod 13 which is attached to and forms a part of the harrow. The said harp is provided for coöperation with the actuating devices from which movement is communicated to the harrow.

In each of Figs. 1 to 6, the lower portion of harp 12 has formed therein the vertical slot 14 in which works the crank-pin 15 carried by the gear-wheel 16, the latter being driven by means of pinion 17 on the shaft 18, which extends transversely through the bowl or tank.

At 19 is one of the tracks which are attached to the side-walls of the bowl or tank, and upon which the trucks 191, 191, carried by cross-rods 4 and 13 rest and travel when the harrow is in its lowest position. As thus far described, the construction is or may be substantially as heretofore.

In carrying the invention into effect, I employ in the embodiment of the invention which is shown in Figs. 1 to 4, a cam 20, which is connected with the gear 16 so as to turn in unison therewith, and I provide the harp or arm 12 with a cam-follower constituted by a shoe 21, with the under face of which the said cam engages. The said cam is formed with a grade which acts against the working face of the shoe to lift the harrow gradually from the lowest position of the latter, and with another grade which serves to lower the harrow gradually to the said position again. Fig. 1 shows the harrow in its lowest position, in which its trucks rest upon the tracks 19, and at about the middle point of its movements or traverse in the direction from the feeding-end of the latter. As the cam rotates from the position shown in Fig. 1 to that shown in Fig. 2, its lifting grade begins smoothly to raise the harrow, raising the latter part way as shown in Fig. 2, before the crank-pin gains on the harrow sufficiently to take against the upper end of the slot 14 in arm 12, which it does easily and without shock. The crank-pin in its continued rotation raises the harrow through the remainder of the lift of the latter, and then lowers the same until the shoe 21 takes bearing upon the lowering grade of the cam, as shown in Fig. 4, meanwhile acting against one side-wall of the slot 14 to carry the harrow endwise toward the receiving or feeding end of the bowl or tank. When shoe 21 takes bearing as aforesaid upon the lowering grade of the cam, the said grade serves to control the remainder of the descent of the harrow, and it acts to support the harrow and gradually reduce its rate of descent until the trucks or bowls again come to rest upon tracks 19, along which they roll as the crank continues its rotation from the position shown in Fig. 4, to and through that shown in Fig. 1. For convenience in setting the parts, shoe 21 is secured to arm 12 by means of bolts 22, 22, passing through vertical slots 23, 23, in the said shoe, thereby providing for vertical adjustment of the shoe upon the arm. The construction and arrangement may be varied more or less from what is shown in the drawings. Thus, the cam may be utilized to support the harrow in its lowest position, in which case the tracks and rollers or trucks may be dispensed with.

Fig. 5 shows a construction in which the cam, 200, is constructed to raise the harrow to its highest elevation and support it while there, the crank acting at such time simply to communicate endwise movement to the harrow. A track 19 is shown, but may be dispensed with and the cam utilized to support the harrow while in its lowest position.

In Fig. 6 the cam-follower is constituted by an anti-friction roll, 211, by the employment of which friction and wear are reduced, and the cam, 201, is properly shaped to coöperate therewith.

At 24, in each of Figs. 1 to 6, is a stay-rod connected at its opposite ends to the lower end of harp 12, at substantially the point at which the crank exerts its transverse pressure against the said harp, and to a cross-rod 4 at an intermediate point in the length of the harrow, and serving to stiffen the said harp, as well as obviate tendency of the harrow to bend or buckle.

Fig. 7 shows a construction embodying a somewhat different form of cam, 202, engaging with a shoe 21, carried by the harp, and in which the slotted lower portion of the harp, below the said shoe, is dispensed with, the tie-rod being connected with a crank-pin, 151, carried by the cam-disk.

Fig. 8 shows a construction in which the harp, therein, marked 12$^a$ is furnished with a yoke, 121, within the opening of which fits a so-called three-throw eccentric 203 combining within itself the functions of a crank in producing the longitudinal movements of the harrow, and of a cam in raising and lowering the harrow. In Figs. 6, 7 and 8, tracks 19 are shown, but usually will be dispensed with.

In Letters Patent No. 675,069, granted to me May 28, 1901, I have shown the bowl or tank provided with tracks having raised end-portions which coöperate with the trucks or rollers of the harrow in assisting the harrow-actuating crank in starting the rise of the harrow, and in enabling the trucks or rollers to strike the tracks easily in the descent of the harrow. The present invention enables the said raised end-portions to be dispensed with, when desired, in cases in which the trucks or rollers and tracks are employed.

I claim as my invention:—

1. In a wool-washing machine, or the like, the combination with the harrow, an arm projecting therefrom, and a crank engaging said arm and communicating longitudinal movement to the harrow, of a cam also engaging such arm, and supporting the harrow during the rise and descent of the latter.

2. In a wool-washing machine, or the like, the combination with a harrow, its slotted arm having a cam-follower, and a rotating crank working in a slot of said arm, of the rotating cam engaging with the said follower.

3. In a machine for washing fibrous materials, the combination with the harrow, an arm projecting therefrom and carrying a cam-follower, a rotating crank operatively connected with said arm to produce longitudinal movement of the said harrow, and a rotating cam engaging with the said cam-follower and operating to raise and lower the harrow.

4. In a machine for washing fibrous materials, the combination with the harrow, an arm projecting therefrom and carrying an anti-friction roll, a rotating crank operatively connected with said arm, to produce longitudinal movement of the said harrow, and a rotating cam engaging with the said roll and operating to raise and lower the harrow.

5. In a machine for washing fibrous materials, the combination with the harrow, an arm projecting therefrom and carrying a cam-follower, a rotating crank operatively connected with said arm, whereby longitudinal movement of the said harrow is produced, a rotating cam engaging with the said cam-follower and operating to raise and lower the harrow, and a tie-rod extending from the point at which the crank exerts its transverse pressure to a relatively remote point in the length of the harrow.

In testimony whereof I affix my signature in presence of two witnesses.

FREDERICK G. SARGENT.

Witnesses:
 CHAS. G. SARGENT,
 A. E. DAY.